United States Patent [19]
Wittrock

[11] Patent Number: 5,863,588
[45] Date of Patent: Jan. 26, 1999

[54] PROCESS OF MAKING A FOOD PRODUCT AND PRODUCT THEREBY

[76] Inventor: Harold R. Wittrock, 3836 Stroschen Dr., Cincinnati, Ohio 45248

[21] Appl. No.: 773,928

[22] Filed: Dec. 30, 1996

[51] Int. Cl.$^6$ .................................. A23F 3/34; A23F 5/44
[52] U.S. Cl. .......................... 426/594; 426/430; 426/436; 426/518; 426/595; 426/596; 426/598; 426/629; 426/632
[58] Field of Search ...................... 426/594, 595, 426/596, 598, 518, 430, 436, 629, 632

[56] References Cited

U.S. PATENT DOCUMENTS

| | | | |
|---|---|---|---|
| 1,018,462 | 2/1912 | Warner | 426/629 |
| 1,213,854 | 1/1917 | Fleming | 426/598 |
| 1,273,144 | 7/1918 | Burdick et al. | 426/598 |
| 1,348,999 | 8/1920 | Kellog et al. | 426/598 |
| 1,366,495 | 1/1921 | Roewade | 426/598 |
| 4,639,374 | 1/1987 | Matsunobu | 426/598 |

FOREIGN PATENT DOCUMENTS

| | | | |
|---|---|---|---|
| 19266 | 4/1983 | Japan | 426/436 |

OTHER PUBLICATIONS

Ranhotra, G.S. Nutrient Composition of Spelt Wheat 1996 IFT Annual Meeting: Book of Abstracts p. 16.

The Wonder Food Spelt, by W. Strehlow 1989 booklet, Purity Food, Inc., Okemo, MI, pp. 1–41.

Hildegard, *Hildegard of Bingen's Medicine* (book), published 1988 by Bear & Company, Sante Fe, New Mexico.

*Primary Examiner*—Helen Pratt
*Attorney, Agent, or Firm*—Frank L. Zugelter

[57] ABSTRACT

A food product or cereal is formed by a mixture of the ingredients spelt, almonds and pumpkin seeds. The ingredients are separately washed, blanched, dry roasted, and then subjected to a grind between a coarse and a medium grind. Thereafter, the ingredients are mixed together in specific proportions to produce the food product. A broth or brew is generated with the food product by the addition of water brought nearly to a boil. The broth or brew is generated by depositing the food product in a suitable receptacle, adding the water that has been brought nearly to a boil, the combination of food product and broth or brew then stirred. Favorable foods, sweeteners, etc., may be added, to the desire of the person consuming such combination. The combination provides a nutritious food for consumption.

12 Claims, No Drawings

PROCESS OF MAKING A FOOD PRODUCT AND PRODUCT THEREBY

TECHNICAL FIELD

This invention is directed to and is related to a novel wholesome food product or cereal that is broth or brewed to provide a flavorable liquid drink, after which the food product or cereal may be immediately, with the broth or brew, or otherwise, consumed.

BACKGROUND OF INVENTION

Spelt, one of the ingredients of the food product, has been known for centuries, particularly in Europe, and is a grain among the original grains known to man. It is a hard, reddish-colored whole grain, but is not like wheat. In this invention, it is mixed with seeds and nuts to provide a wholesome food product or cereal that then is first particulated, then water added to form a broth or brew, and thereafter, as a fibrous cereal, with the broth or brew, or afterwards without the broth or brew, consumed. One of the observable benefits that I have personally come by, from a daily or regular intake of the broth or brew and cereal, taken over a goodly period of days, weeks and months, is a higher level of energy and loss of overweightness, among other physical conditions, and which has not physically harmed me but rather has provided and is providing a healthier condition. Also, such consumption satisfied and does satisfy my hunger for a considerable period of time during the same day of such consumption. This in the sense that I do not desire to eat for a considerable length of time throughout the same day on which I consume the broth or brew and cereal. With such consumption, and the lack of hunger for a prolonged period of time during the same day, it stands to reason that my body takes in a lesser amount of calories and fat and which otherwise would be accumulative to the body in a normal manner based on our conventional three-meals-a-day routine. Consequently, loss of weight naturally or logically follows. In any event, the food product or cereal from which the broth or brew is generated does provide a definite basis for a flavorful nutritious broth or brew and edible cereal.

Objects of this invention are to provide a novel food product or cereal and a novel drinkable broth or brew.

A further object of this invention is to provide a broth or brew and cereal that are pleasing to the taste in their consumption.

Another object of this invention is to provide a facile method of producing a broth or brew from the food product, after which broth or the remaining fibrous cereal itself is nutritious and edible.

A still further object of this invention is to provide a food product at a reasonable price to the consuming public.

Another object of the invention is to provide an awareness to the public of the nutritional value and healthful benefits that arise from the consumption of the broth or brew and the food product or cereal.

These and other objects and advantages will become more apparent upon a full and complete reading of the following description and its appended claims.

SUMMARY OF THE INVENTION

The food product comprises a mixture of the whole reddish-colored grain spelt, of the hard kind, with various kinds of whole nuts and seeds, the mixture itself being a blend in the natural state of these ingredients. A desired quantity, based on different and desirable proportions of the mixture of ingredients, namely, of spelt, nuts, and seeds, provides a meritorious basis for its human consumption. The mixture may be either by weight or by volume. Each of the ingredients of the mixture then is dry roasted, to add flavor to the product, after which each of the ingredients of the mixture is cooled, and ready to be processed by grinding and bottling of the food product. A bottled storage is satisfactory.

In preparing the food product for consumption, in terms of a sippable or drinkable liquid and a fibrous cereal, the product is introduced into a receptacle, such as a cup or a pot, in teaspoonful [tsp] fashion or quantity. Water brought to a boil [and not as in boiling water] is added to the product in the cup or pot. The liquid and ingredients are stirred. Particulates of the ingredients of the food product, being heavier than water, settle to the bottom of the cup or pot, while powder from the food product remains in suspension in the broth or brew. The food product's ingredients arrive at a chewable or eatable state. A period of minutes, say, about five (5) minutes, provides time to cook the spelt in the heated water while flavor is drawn from the almonds and pumpkin seeds, all of which attains the chewable or eatable state for the cereal. The broth or brew may again be stirred and then consumed in the ordinary manner of drinking it, along with the flavored ingredients. Or the broth or brew may be drunk with the cereal on the cup's bottom. The flavor of the cereal adds to the pleasure of consuming the broth or brew. Should the fibrous cereal itself be consumed apart from the broth or brew, combining it with honey, blackberries, or the like, adds other or different flavors. A healthy consumable product, broth or brew and cereal, results in practice of this invention.

BEST MODE OF CARRYING OUT THE INVENTION

The food product of this invention comprises a combination of ground spelt, which is a hard reddish-grained whole grain [not wheat] and one or more whole nuts and seeds, examples of which being pre-roasted almonds and pumpkin seeds which provide flavor to the broth or brew being made in the carrying out of the practice of this invention. The almonds are naturally delicious and the pumpkin seeds include a spiciness. Nuts and seeds other than almonds and pumpkin seeds also are contemplated in the scope and spirit of this invention, as tastes and flavors vary. Chestnuts and fennel are further examples of nuts and seeds, which add distinctness to a flavored broth or brew. It is to be understood that other nuts and seeds as well may be substituted for the noted nuts and seeds, depending on a different flavor(s) desired by the maker or brewer.

Kernels of spelt are mixed with the nuts, or seeds, or broth, to arrive at a mixture as the basis of the food product or cereal that is to be combined with water to form the broth or brew. Each of these ingredients first is washed in fresh water, and then blanched, say between 170 degrees F. and 190 degrees F. Thereafter, each is dry roasted separately from the other. The dry roasting of these ingredients is carried out on, say, as an example, a flat pan. The almonds are first chopped up before setting then on its pan. The spelt and the seeds are placed on their respective pans with their corresponding ingredients. The pans are heated in an oven for some 30 to 40 minutes in a range of temperature 275° to 300° F. After the roasting steps are completed, grinding of each of these ingredients follows, to between a coarse and a medium grind. Thereafter the proportions of these ground ingredients are determined, to form the mix of their quantities in the food product. Beginning, as an example, by either weight or volume, with a quantity of spelt that is about 70% of the mixture of the food product, about a 20% quantity of the almonds and about a 10% quantity of the pumpkin seeds are added to the quantity of spelt, with the total quantity of the combined ingredients being mixed together. Another example of the quantities of the ingredients, spelt, nuts and seeds, making up the food product, is one in which spelt makes up at least 50% of the ingredients being mixed together in producing the food product, and the nuts and seeds make up the remaining portions in desired proportions to one another for mixing with the spelt. Another example is the quantity of nuts included in the mixing step approximating 20% to 30% in producing the food product while the quantity of seeds in the same mixing step approximates 10% to 20% in producing the food product, the quantity of spelt making up the remaining amount of the mixed amount, these percentages being either of weight or of volume. Thereafter, the state of this mixture or total quantity or combination thereof is in a condition for containerization, such as in a jar or in a bottle.

To prepare a consumable broth or brew, the stored container is opened, and from it three (3) heaping teaspoonfuls of the food product is removed therefrom and placed in a ceramic or insulated cup to withstand the addition of water reaching its boiling point. The water should not be boiling, rather, its temperature approaches its boiling temperature. The cup of water that has so approached its boiling point is added. The broth or brew if stirred, such as by spoon, and allowed to set and cool for mouth consumption. The resulting broth or brew provides for a more faster and evenly cooking of the food product, whereas, with no stirring, there is a tendency of some of the food product to remain at the bottom of the cup without it being introduced into the broth or brew. Upon cooling of the combination of the food product and the water, by reaching a sippable or drinkable temperature, the broth or brew is consumed by sips in a manner like drinking a hot liquid.

After completion of a full stirring of the broth or brew by which all of the food product is introduced to the broth or brew, the cereal drops to the bottom of the cup. Continued stirring provides for consumption of the cereal while the broth or brew is consumed. However, if not continually stirred, after complete drinking of the broth or brew, the cereal itself at the bottom of the cup is consumed. Sweeteners, such as honey, blackberries or other sweet or flavorable foods may be added to it, prior to, during or after full consumption of the broth or brew, for enhancing its flavor. On the other hand, while maintaining a stirred condition for the broth or brew, all of the flavorable fibrous content of such cereal may be consumed with the broth or brew itself, rather than by itself or with other sweet or flavoring foods.

Mixing the desired proportions of the ground spelt, almonds and pumpkin seeds, or spelt with other nuts and/or seeds, to arrive at the mixture of ingredients constituting the food product, may be readily accomplished by known manual techniques as well as by known techniques in a household kitchen and/or in the food industry by grinding equipment known.

The invention is not limited to the specific ingredients or their proportions in the mixture of the particular ingredients set out in the description above, or to the range of roasting temperature and time periods described. Various changes in the quantities, as well as the grinds, of the ingredients that are mixed together for and in the particulating or grinding step may be resorted to, as well as modifying the temperatures and time conditions in creating the food product or cereal. Also, the sweeteners and/or flavorable foods that are added are not limited to those described above. For example, another addition could be ripe bananas that are mashed into the cereal prior to adding the water brought nearly to its boiling point. All this, without departing from the spirit or scope of the invention. Therefore, only insofar as the invention has particularly been pointed out in the accompanying claims is the same to be limited.

INDUSTRIAL APPLICABILITY

The food product is particularly applicable to the consumer industry, and in addition, to the food industry itself in terms of generating a new product and the necessity of utilizing food processing equipment for producing the food product or cereal in mass quantities.

I claim:

1. A process of producing a food product, comprising kernels of spelt, nuts and seeds, comprising:
   washing in fresh water separately quantities of the kernels of spelt, nuts and seeds,
   blanching each of the washed quantities of the spelt, nuts and seeds,
   dry-roasting separately each of the blanched quantities,
   grinding each of the dry-roasted quantities to between a coarse and a medium grind, and
   mixing together proportions of the kernels of spelt, nuts and seeds to form the food product,
   said proportions comprising:
   approximately 50% spelt, approximately 20% nuts, and approximately 10% seeds.

2. The process of claim 1 wherein:
   the dry-roasting of each of the spelt, nuts, and seeds takes place in a range of 275° F. to 300° F. for a period of time approximating 30 to 40 minutes.

3. The process of claim 2 wherein the nuts comprise almonds.

4. The process of claim 2 wherein the seeds comprise pumpkin seeds.

5. As a new article of manufacture, the product produced by the process of claim 2.

6. The process of claim 1 wherein the nuts comprise almonds.

7. As a new article of manufacture, the product produced by the process of claim 6.

8. The process of claim 1 wherein the seeds comprise pumpkin seeds.

9. As a new article of manufacture, the product produced by the process of claim 8.

10. The process of claim 1 wherein the nuts comprise almonds and the seeds comprise pumpkin seeds.

11. As a new article of manufacture, the product produced by the process of claim 10.

12. As a new article of manufacture, the product produced by the process of claim 1.

* * * * *